Feb. 19, 1924.
H. IZARD
AUGER, BIT, OR DRILL
Filed Dec. 10, 1919
1,484,352
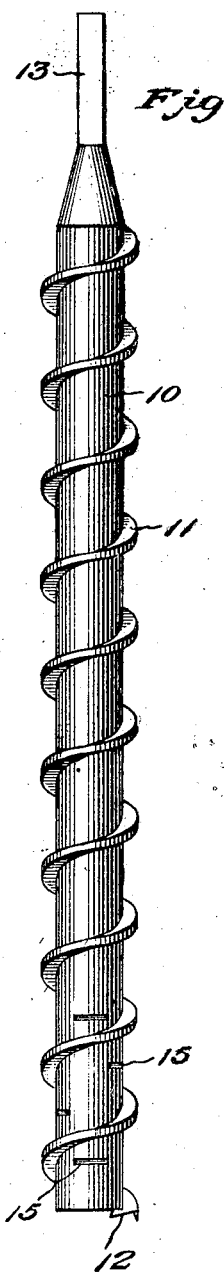
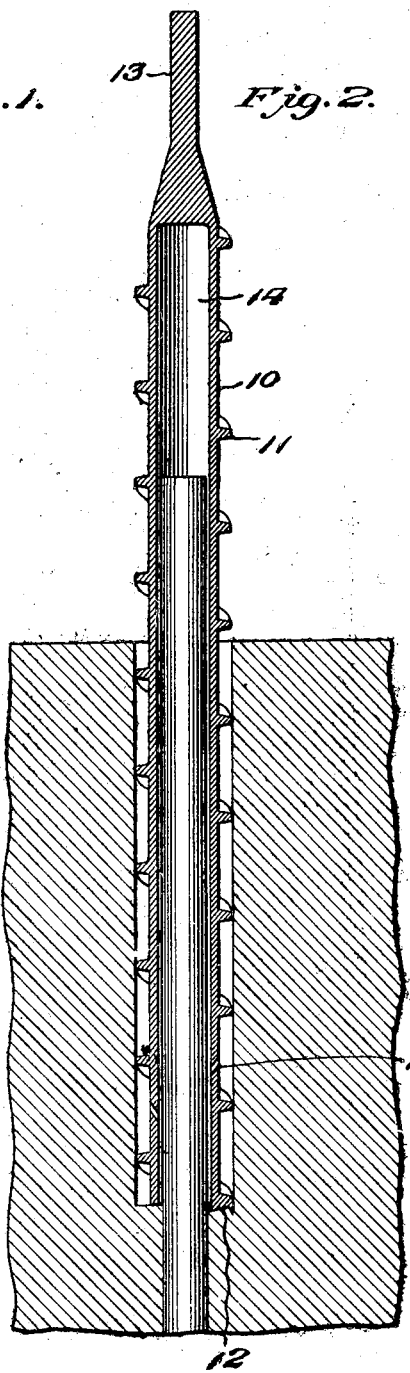
Inventor
Henry Izard
By Victor J. Evans
Attorney Patented Feb. 19, 1924.

1,484,352

UNITED STATES PATENT OFFICE.

HENRY IZARD, OF MOBILE, ALABAMA.

AUGER, BIT, OR DRILL.

Application filed December 10, 1919. Serial No. 343,736.

*To all whom it may concern:*

Be it known that I, HENRY IZARD, a citizen of the United States, residing at Mobile, in the county of Mobile and State of Alabama, have invented new and useful Improvements in Augers, Bits, or Drills, of which the following is a specification.

This invention relates to augers, bits or drills and has for an object the provision of a tool of this character for use in removing bolts, rods or the like from either wood or metal.

In tearing or wrecking structures of various kinds, especially in dismantling or wrecking vessels it is desirable to remove the bolts from the material with the least possible waste of such material, so as to save the same for future use. It is also desirable to accomplish the removal of the bolts with the least possible amount of time and labor and thereby reduce the cost of wrecking or dismantling.

For the accomplishment of the above and other objects, the invention aims to provide an auger, bit or drill which will remove a small amount of material surrounding a bolt and permit of its ready removal, the construction of the invention being such that the bolt will form a guide and the enlarged bore made by the auger, bit or drill will be upon the same center as the former bore. This is especially useful in repair work, as it permits of the material again being used, by the substitution of a bolt of greater diameter than the one removed.

Other objects and advantages of the invention will appear as the following description is read in connection with the accompanying drawings.

In the drawings:

Figure 1 is a side elevation of an auger or bit or drill embodying the present invention.

Figure 2 is a central longitudinal sectional view of the same.

Referring to the drawings in detail, wherein like characters of reference denote corresponding parts, there is illustrated an auger bit, which includes a central longitudinally extending body portion 10 surrounded by the usual spiral 11 and provided at one end with cutting edges 12 as is usual in tools of this character. The opposite end of the bit is provided with a shank 13 for connection with a suitable operating machine or tool.

The novelty of the invention resides in providing the body member with a concentrically arranged longitudinal bore 14, which is adapted to have a working fit around the bolt to be removed, the size of the bore of the bit being determined by the size of the bolt.

In the use of the invention for the removal of bolts from the hulls of vessels or similar structures, the head of the bolt is easily removed by some convenient means and the auger or bit positioned over the end of the bolt. The bit is then positioned over the end of the bolt and operated to remove the surrounding material, whereupon the bolt may be easily removed. Only a small amount of material is thus lost and the said material is not mutilated in the manner to permit of its future use.

The body portion 10 of the device is formed with slots or openings 15 that establish communication between the bore 14 and the outer side of the body so that the material surrounding the bolt or rivet may be discharged onto the exterior of the body portion in the operation of the bit or auger, thereby maintaining the bore open at all times so as to prevent binding between the body portion and the bolt or rivet incident to the accumulation of material within the bore. These openings or slots 15 are preferably arranged at an angle with respect to the longitudinal axis of the body portion, as clearly shown in Figure 2, so as to facilitate the discharge of the material from the bore.

Having described the invention what is claimed is:—

An auger, bit or drill for removing bolts or the like and including a central longitudinally extending body portion having a concentric longitudinally extending bore open at its outer end and having a working fit around the bolt or other object to be removed, said body portion being formed with transversely elongated staggered openings designed to establish communication between the bore and the outer surface of the body portion and spaced apart along the length of the body portion, said openings being arranged at an incline with respect to the longitudinal axis of the body portion to facilitate the discharge of material from the bore.

In testimony whereof I affix my signature.

HENRY IZARD.